UNITED STATES PATENT OFFICE.

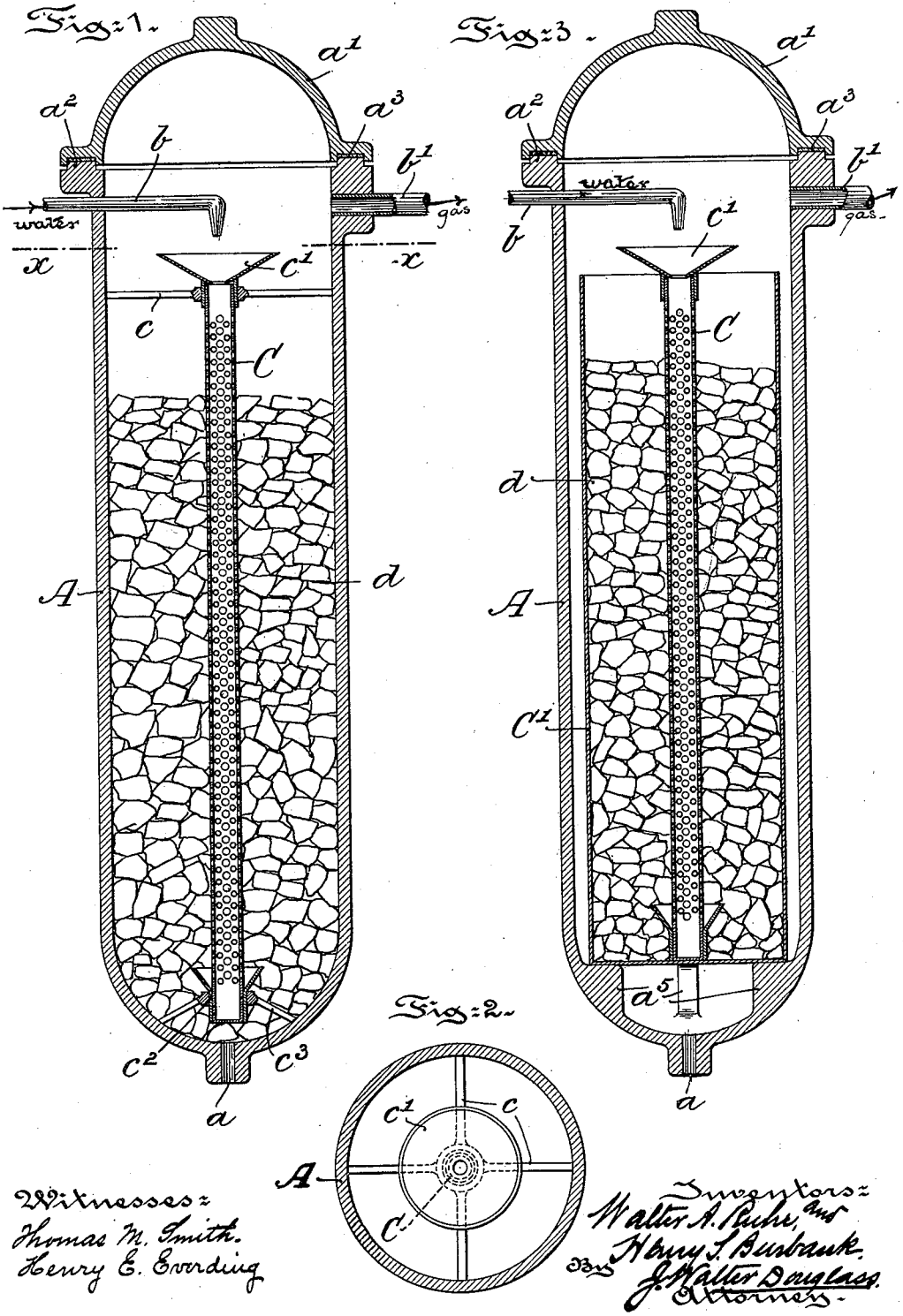

WALTER A. RUHE AND HENRY S. BURBANK, OF PHILADELPHIA, PENNSYLVANIA.

ACETYLENE-GAS APPARATUS.

SPECIFICATION forming part of Letters Patent No. 595,924, dated December 21, 1897.

Application filed March 26, 1897. Serial No. 629,338. (No model.)

*To all whom it may concern:*

Be it known that we, WALTER A. RUHE and HENRY S. BURBANK, citizens of the United States, residing at the city of Philadelphia, in the county of Philadelphia and State of Pennsylvania, have invented certain new and useful Improvements in Retorts for Acetylene-Gas Apparatus, of which the following is a specification.

Our invention has relation to the providing of a retort wherein by a mutual decomposition of a fluid, such as water, with a solid matter, as acetylid or carbid, a gas is adapted to be generated for illuminating and other purposes.

The principal objects of our invention are, first, to provide a strong or durable and efficient retort for generating a gas and supplying from the same for utilization, the construction of the retort being such that the generation of the gas by the supply of a fluid to solid matter in the retort is regulated from the center to insure a greater volume of gas being derived from the solid matter by the mutual decomposition of both liquid and solid matters; second, to provide a retort for generating a gas for illuminating and other purposes and produced by the mutual decomposition of a fluid, as water, with a solid matter, as acetylid or carbid, in which the fluid for effecting with the solid matter decomposition is supplied through a perforated tube or cylinder extending downward into the retort, the fluid being distributed into the surrounding body of solid matter uniformly and the gas generated therefrom rising in the retort and is discharged through an offtake provided in the upper part thereof; third, to provide a retort for generating gas with a removable perforated tube through which a fluid is permitted to flow into the same from an elevated supply and distributed into the body of solid matter, which by the mutual decomposition of both is adapted to produce a gas in larger volume and with greater uniformity and which is discharged from the retort through an offtake; fourth, to provide a retort with an internal jacket or shell and a central perforated tube or cylinder for receiving and distributing a fluid into a body of solid matter, such as acetylid or carbid, and the jacket or shell suitably supported within the retort, and, fifth, to provide a retort for generating gas with a removable perforated fluid tube or cylinder for permitting of a radial discharge of the fluid from the same into a body of solid matter, which by the mutual decomposition of both the fluid and the solid matter produces a gas for illuminating and other purposes and which gas is discharged uniformly and in increased volume from the retort through an offtake.

Our invention, stated in general terms, consists of a retort for generating acetylene gas constructed and arranged in substantially the manner hereinafter described and claimed.

The nature, scope, and characteristic features of our invention will be more fully understood from the following description, taken in connection with the accompanying drawings, forming part hereof, in which—

Figure 1 is a vertical longitudinal section through a retort of our invention in one form of the same, showing the centrally-perforated fluid tube or cylinder detachably mounted therein. Fig. 2 is a transverse sectional view on the line $x$ $x$ of Fig. 1, showing the spider-frame for supporting the upper portion of the detachable perforated tube or cylinder in position within the retort; and Fig. 3 is a vertical longitudinal sectional view of a modified form of the retort, showing the perforated central fluid tube or cylinder detachably mounted in a socket of a shell or jacket removably secured within the casing of said retort closed by a dome-shaped cap and the upper portion provided with a fluid-supply to said tube or cylinder and also with the gas-offtake therefrom.

Referring to the drawings, A is the casing of the retort, preferably cylindrical in form, with an arched base provided with an outlet $a$, and at the upper end provided with an arched cap or cover $a'$, seated to a projection $a^2$, provided with a rubber or other gasket $a^3$ to form a tight joint between the cap or cover and the upper portion of the casing of the retort. In the upper part of the casing of the retort is provided a fluid-supply pipe $b$, extending inward and downwardly therein, and $b'$ is a gas-offtake located also in the upper part of the retort A.

$c$ is a spider-frame secured in the upper portion of the retort and adapted to hold in position a vertically-arranged perforated tube or cylinder C, provided at the upper end with preferably a funnel-shaped mouth $c'$, and the lower end of this tube or cylinder is fitted to a flaring socket or bearing $c^2$, provided with legs $c^3$, resting against the internal surface of the base of the retort A.

$d$ in Fig. 1 represents solid matter, such as acetylid or carbid of calcium, mounted in the retort-casing and surrounding the vertically-disposed tube or cylinder C. Water is admitted through the pipe $b$ from a suitable supply (not shown) and flows through the funnel-shaped mouth of the tube or cylinder C in sufficient quantity to permit of a radial discharge of the same through the perforations of the tube or cylinder into the body of solid matter $d$ to permeate the same and thereby to create by the mutual decomposition of the water or fluid with the solid matter a gas which has become known as "acetylene" gas. The lower portion of the tube or cylinder forms a water seal, so that the gas is generated from within a short distance of the base of the retort and rises in an upward direction, the discharge of the fluid into the body of the solid matter being radially from the center of the retort, and the generated gas is discharged from the retort under due regulation through the offtake $b'$.

In Fig. 3 of the drawings the apparatus is the same as that illustrated in Fig. 1, with the following exception: that within the retort is provided a jacket or shell C', detachably supported upon a lug or projection $a^5$ in the base of the retort and preferably formed integral therewith. Within the jacket or shell C' is mounted solid matter, such as acetylid or carbid of calcium. In Fig. 3 the jacket or shell C' is held in the retort A so as to leave a space between the casing of said retort and the jacket, and by removing the cap in any preferred manner the jacket or shell C', as well as the tube or cylinder C, may be removed for cleaning, repairs to the retort, or for any other required purpose. The cap of the retort, as illustrated in Figs. 1 and 3, may be secured to position by being clamped to the projection on the upper portion thereof, or by the introduction of bolts through said projections, or in any other suitable manner.

Hitherto in the generation of acetylene gas there has been a great want of uniformity as to generation of the same or of the carbid being so permeated with the fluid as to effect an actual mutual decomposition of the two elements to produce the gas. This has been due to the fact that the fluid coacting with the solid matter has not been brought into such a direct connection with the solid matter as to permit of real mutual, thorough, or complete decomposition; but by the provision of the perforated centrally-arranged tube or cylinder C it will be observed that the fluid is brought into the presence of the solid matter in all portions thereof and from the bottom upward, so that a much more thorough generation of the gas is effected, as well as a better quality of gas delivered to the offtake for utilization for illuminating and other purposes. The central tube or cylinder C may be constructed of any suitable withstanding material, and it will be obvious as to minor details in the arrangement of the interior of the retort that modifications may be made without departing from our invention and still be within the scope thereof.

Having thus described the nature and objects of our invention, what we claim as new, and desire to secure by Letters Patent, is—

A retort for generating gas, comprising a shell or casing having a narrow outlet in the base thereof and a detachable cap or cover applied to the upper part of the same, a water-supply pipe located in the upper portion of said shell and extending into and terminating in a downwardly-projecting tapering outlet-nozzle, a gas-offtake located opposite the water-supply pipe in said shell, a detachable perforated tube or cylinder supported in said retort in a funnel-shaped device, and the upper end of said perforated tube or cylinder having a flaring or funnel-shape mouth, substantially as and for the purposes described.

In testimony whereof we have hereunto set our signatures in the presence of two subscribing witnesses.

WALTER A. RUHE.
HENRY S. BURBANK.

Witnesses:
J. WALTER DOUGLASS,
THOMAS M. SMITH.